Figure 1:
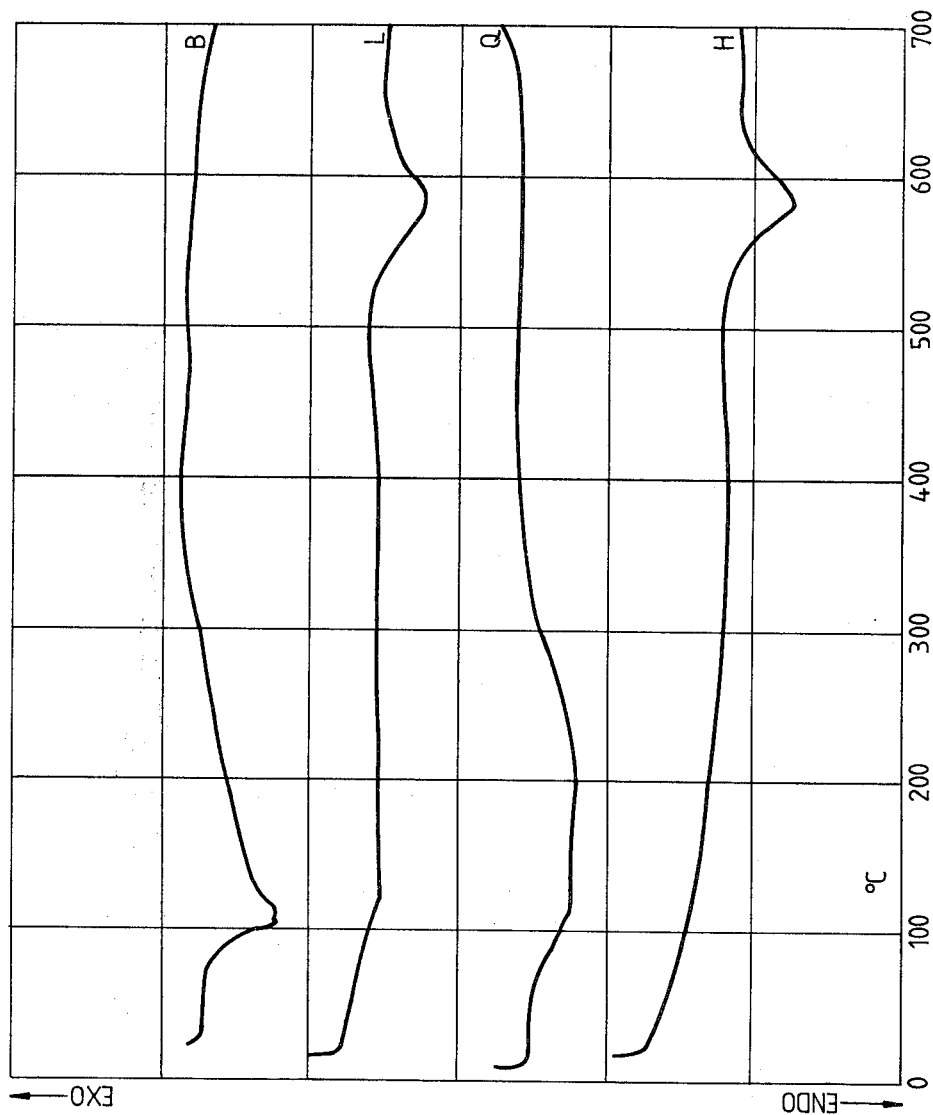

United States Patent [19]

Dyer et al.

[11] 4,418,048

[45] Nov. 29, 1983

[54] ALUMINOPHOSPHORUS COMPOUNDS

[75] Inventors: Alan Dyer, Manchester; Abraham Araya, London, both of England

[73] Assignee: Laporte Industries Limited, London, England

[21] Appl. No.: 158,294

[22] Filed: Jun. 10, 1980

[51] Int. Cl.$^3$ ............................................. C01B 25/36
[52] U.S. Cl. .................................. 423/305; 210/656; 210/683; 423/306
[58] Field of Search ............... 423/305, 306; 210/683, 210/681, 656

[56] References Cited

U.S. PATENT DOCUMENTS

| 2,280,848 | 4/1942 | Pole | 423/306 |
|---|---|---|---|
| 2,550,490 | 4/1951 | McDonald | 423/306 |
| 3,097,949 | 7/1963 | Lauck et al. | 423/306 |
| 3,386,801 | 6/1968 | Kuehl . | |
| 3,397,142 | 8/1968 | Guth et al. . | |
| 4,147,758 | 4/1979 | Adrian et al. | 423/305 |

FOREIGN PATENT DOCUMENTS 2034266 1/1971 Fed. Rep. of Germany .
1242741 8/1971 United Kingdom .

OTHER PUBLICATIONS

Slack, *Phosphoric Acid*, vol. I, Part I, Marcel Dekker (1968), pp. 19-24.

Flanigen et al., Molecular Sieve Zeolites-I, American Chemical Society (1971), pp. 83-89.

*Primary Examiner*—O. R. Vertiz
*Assistant Examiner*—Wayne A. Langel
*Attorney, Agent, or Firm*—Larson and Taylor

[57] ABSTRACT

The present invention provides the following:
(a) An aluminophosphorus compound wherein the atomic ratio of P to Al exceeds 1:1 and having anion exchange properties.
(b) A process for preparing such an aluminophosphorus compound comprising treating an aluminous compound, for example a zeolite, a clay, or alumina with a melt comprising a phosphate, for example ammonium dihydrogen orthophosphate, and removing excess phosphate from the compound thereby formed.
(c) A process for at least partially removing anions from an aqueous solution which comprises contacting the aqueous solution containing the anions with the aluminophosphorus compound.
(d) A process for the chromatographic separation of two anions in aqueous solution wherein the chromatographic stationary phase comprises the aluminophosphorus compound.

16 Claims, 6 Drawing Figures

ALUMINOPHOSPHORUS COMPOUNDS

The present invention relates to aluminium compounds, more particularly to aluminophosphorus compounds.

More particularly, the present invention provides a range of novel aluminophosphorus compounds having utility "inter alia", as anion exchangers and a method by which they may be prepared.

A wide range of inorganic cation exchangers is known including, for example, natural or synthetic zeolites and natural or synthetic clays and such cation exchangers are widely used in, for example, water treatment. However there are presently commercially available no reversible inorganic anion exchange materials.

The aluminophosphorus compounds provided by the present invention are characterised by an atomic ratio of phosphorus to aluminium in excess of 1:1 that is, they contain more atoms of phosphorus than of aluminium.

The aluminophosphorus compounds provided by the present invention may be prepared, also according to the invention, by treating an aluminous compound; that is a compound containing aluminium combined with oxygen in a framework which may be, for example, a sheet, a layered or a three dimensional type of framework, and which may contain other atoms for example silicon; which aluminous compound may, for example, be a natural or synthetic zeolite, or a natural or synthetic clay or alumina; with a melt comprising a phosphate.

The phosphate used to form the melt for the treatment of the aluminous compound is, preferably, an ammonium phosphate since these salts melt at not unduly high temperatures, and is, particularly preferably, ammonium dihydrogen orthophosphate ($NH_4H_2PO_4$) which melts at 190° C. The treatment of the aluminous compound is preferably carried out at a temperature at least 20° C. above the melting point of the phosphate and, suitably, at a temperature below the decomposition temperature of the phosphate and, preferably but not essentially, at a temperature not more than 100° C. particularly preferably not more than 60° C. above the said melting point. Suitably, treatment of the aluminous compound with ammonium dihydrogen phosphate may be conducted of from 210° C. to 250° C.

A preferred procediure for conducting the treatment of the aluminous compound involves placing a layer of the compound upon a layer of the phosphate in a suitable vessel and heating the vessel so that the compound sinks into the phosphate as it melts. Alternative means of conducting the treatment will be readily apparent to those versed in the conduct of practical chemical operations such as, for example, the expedient of causing a melt of the phosphate to move upwardly into a suitably supported body of the aluminous compound. Preferably, the phosphate is in a weight excess over the aluminous compound, such excess suitably being at least 3-fold, for example at least 5-fold.

The contact between the phosphate melt and the aluminous compound is preferably maintained for a period of time sufficient to allow the formation of the novel compounds of the invention to an appreciable extent, which time is, preferably, at least 5 hours, particularly preferably at least 7 hours but which, more advantageously, is at least 12 hours for example more than 18 hours. It may be found desirable to use a contact time even in excess of this, for example up to 48 or 60 hours to maximise the yield of the desired aluminophosphorus product.

After the treatment of the aluminous compound with the melt, the product mixture is preferably poured into boiling water, or a boiling aqueous solution of a salt, so as to dissolve surplus phosphate and the remaining solid is then separated, for example by centrifugation or filtration.

Amongst zeolites which may be used to form the aluminophosphorus compounds of the present invention are those having the general formula.

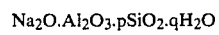

$$Na_2O.Al_2O_3.pSiO_2.qH_2O$$

in which q is usually non-zero and in which p can very widely but preferably, has a positive, not necessarily integral, value up to 10. It is recognised that the zeolites may be such that $Na_2O$ in the above general formula is replaced, at least partially, by $K_2O$, $(NH_4)_2O$, $CaO$ or other oxides, or by mixtures of such, or other, oxides. Examples of such suitable zeolites are zeolite A for which the value of p in the above general formula is about 2, zeolite X for which the value of p in the above general formula is about 2.5, zeolite Y for which the value of p in the above general formula is from about 3 to about 5 and clinoptilolite which is a naturally occuring zeolite in which the value of p in the above general formula is about 10 and in which formula some of the $Na_2O$ is replaced by $K_2O$.

Amongst clays which may be used to form the aluminophosphorus compounds of the present invention are those of the kaolin group, for example kaolinite itself or meta-kaolinite which may be obtained by calcining kaolinite at, for example, 550° C. for 1 hour.

During the treatment of the aluminous compound with the melt, when using an ammonium phosphate, the evolution of ammonia gas is observed despite the fact that the phosphate may be stable to decomposition at the temperature used. This ammonia is presumably produced when the phosphate reacts with the aluminous compound to incorporate phosphorus.

When subjected to x-ray powder diffraction investigations the aluminophosphorus compounds provided by the invention tended to show a substantial number of common identifying features together with features which could be attributed to residual quantities of the aluminous compound. For example, the products prepared according to the invention from zeolite A, zeolite X, zeolite Y, kaolinite, meta-kaolinite and alumina all showed a substantial number of at least the more marked of the following d-spacings or of d-spacings not differing substantially therefrom, to an extent which would lead an expert in the interpretation of x-ray powder diffraction patterns to deduce that all of the products showed a common feature not attributable to the starting materials and that that common feature, as judged by reference to published collections of x-ray powder diffraction patterns, was novel. The d-spacings referred to above are as follows.

| d-spacings (A) | Intensity |
| --- | --- |
| 5.78 | VS |
| 5.25 | W |
| 4.84 | W |
| 4.15 | M |
| 3.90 | S |
| 3.37 | W |
| 3.12 | W |

-continued

| d-spacings (A) | Intensity |
| --- | --- |
| 2.94 | VS |
| 2.60 | VW |
| 2.47 | VW |
| 2.42 | W |
| 2.31 | W |
| 2.06 | W |
| 1.94 | M |

VS = very strong
S = strong
M = medium
W = weak
VW = very weak.

Of course, other lines can be identified some of which can sometimes be attributed to, for example, residual quantities of the particular aluminous compound used or to a modified form thereof due, possibly, to the particular process steps used in the manufacture of the aluminophosphorus compounds. However the x-ray powder diffraction patterns show no other identifiable crystalline substance.

The aluminophosphorus compounds of the invention as already stated, have novelty by virtue of the preponderance of phosphorus atoms therein. It is more particularly envisaged that the compounds may, suitably, have a phosphorus to aluminium ratio of from about 1.5 to 3, for example from about 2 to about 2.5. A remarkable constancy has been found in the phosphorus to aluminium ratio which is thought to indicate a particular structural relationship between these elements.

The compounds provided by the invention, where the aluminous compound contains silica, generally have a substantial silica content. It is not known whether this silica forms part of the framework of the aluminophosphorus compounds by isomorphous substitution for aluminium or whether it does not. It is deduced however, that it may not play an essential part in the compounds of the invention since that product may also be attained from alumina there being no silica present.

Some at least of the compounds of the invention show a content of nitrogen remaining after the evolution thereof which occurs during the preparation of the compounds. Thermal analysis shows a characteristic endotherm between about 500° C. and 600° C. on the differential scanning calorimetry profile which cannot be explained by a loss of structural or co-ordinated water since such is not shown to be present by infra-red absorbtion analysis. It may be that the endotherm is due to a deammination reaction consistent with the presence of nitrogen.

The anion exchange properties of the compounds of the invention lead to diverse uses therefor and the present invention further provides a process for at least partially removing anions from an aqueous solution which comprises contacting the aqueous solution containing the anions with an alumino phosphorus compound provided by the invention having anion-exchange properties. Suitably the anions may be halide, for example fluoride anions. It may often be desirable, before the product is used, to make the material as homoanionic as possible by treatment with an aqueous solution containing a particular desired anion.

While we have above referred especially to the anion-exchange capacity of the compounds provided by the invention, it should be noted that they may have an appreciable (although generally not very great) cation-exchange capacity.

The term "anion-exchange" has been used throughout this specification to refer to the concomitant uptake of one anion and the release of another. It is not intended that the term be limiting to any particular mechanism by which this practical effect may be achieved.

In respect of the compounds provided by the present invention the reference above to anion-exchange properties is to be regarded as characterising the new materials, and not to be limiting on the invention to those aspects of the compounds actually in use as anion exchangers. In zeolites, it is known that the quantity and nature of various cations in the channels and cavities of the aluminosilicate framework affects the retention even of neutral molecules in the zeolite and also affects the catalytic properties of the zeolite and the cation-containing zeolites are valuable as molecular sieves and catalysts. Similar applications for the compounds provided by the present invention are envisaged, especially in applications where the hydrophobicity of the materials (affected differently by anions than by cations) is of importance.

The present invention also provides a process for the chromatographic separation of two anions in aqueous solution wherein the chromatographic stationary phase comprises an alumino phosphorus compound provided by the invention.

Chromatographic separation processes may be performed in the usual manner by taking advantage of the difference in affinity of the alumino phosphorus compounds for the anions in question. Following a conventional technique, the aqueous solution may be applied to a column containing the compounds provided by the invention so as to put the ions into a narrow band at one end of the column, and then the band may be transmitted towards the other end of the column, with progressive separation of the band into two or more bands, by application of a suitable eluent. This is, of course, only an example of a possible procedure. It is not necessary that a column should be used; for instance the compounds provided by the invention could be incorporated into a thin layer on a support plate.

The present invention also provides catalysts consisting of or comprising the aluminophosphorus compounds provided by the present invention.

The invention will now be illustrated by the following examples 1 to 10 with reference to Tables I to IV herein and FIGS. 1 to 4 attached hereto.

Table I—shows the x-ray powder diffraction pattern of the zeolite 4A(Q) used in Example 1 and of the aluminophosphorus compound (H) prepared therefrom according to the invention. The symbol "d/Å" is used to denote a particular reflection in angstroms and the symbol "I/Io" its intensity as a %.

Table II—shows the analysis by weight, expressed as oxides of the Hector Clinoptilolite used in Example 4(A) and of the purified form thereof produced in the course of that Example (B).

Table III—shows the x-ray powder diffraction pattern of the Hector Clinoptilolite used in Example 4(A), of the purified form thereof (B) and of aluminophosphorus compound (L) prepared from (B) according to the invention. The symbols "d/Å" and "I/Io" have the meanings above ascribed to them "Int" denotes "Intensity".

Table IV—shows the x-ray powder diffraction patterns of the aluminophosphorus compounds prepared by Examples 4–10. The symbols used are as in Tables I and III.

FIG. 1—shows differential thermal analysis (DTA) curves for the zeolite 4A(Q) used in Example 1, the aluminophosphorus compound prepared therefrom (H), the purified clinoptilolite prepared in Example 4 (B) and the aluminophosphorus compound prepared therefrom (L). The ordinate is divided into arbitrary units and the abscissa into °C.

Figure 2:
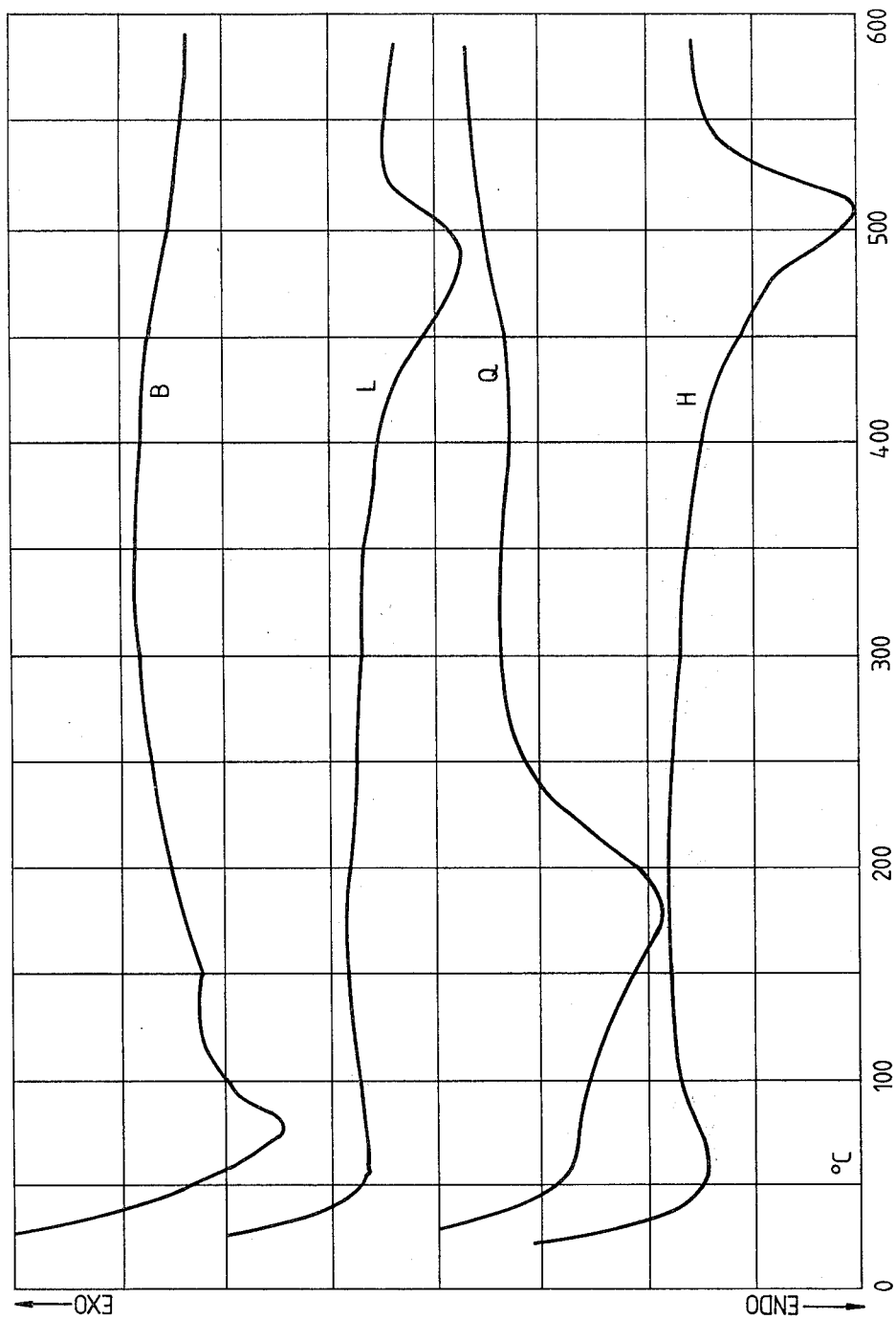

FIG. 2—shows differential scanning calorimetry (DSC) curves for the same materials (Q), (H), (B) and (L). Again, the ordinate is divided into arbitrary units and the abscissa into °C.

Figure 3:
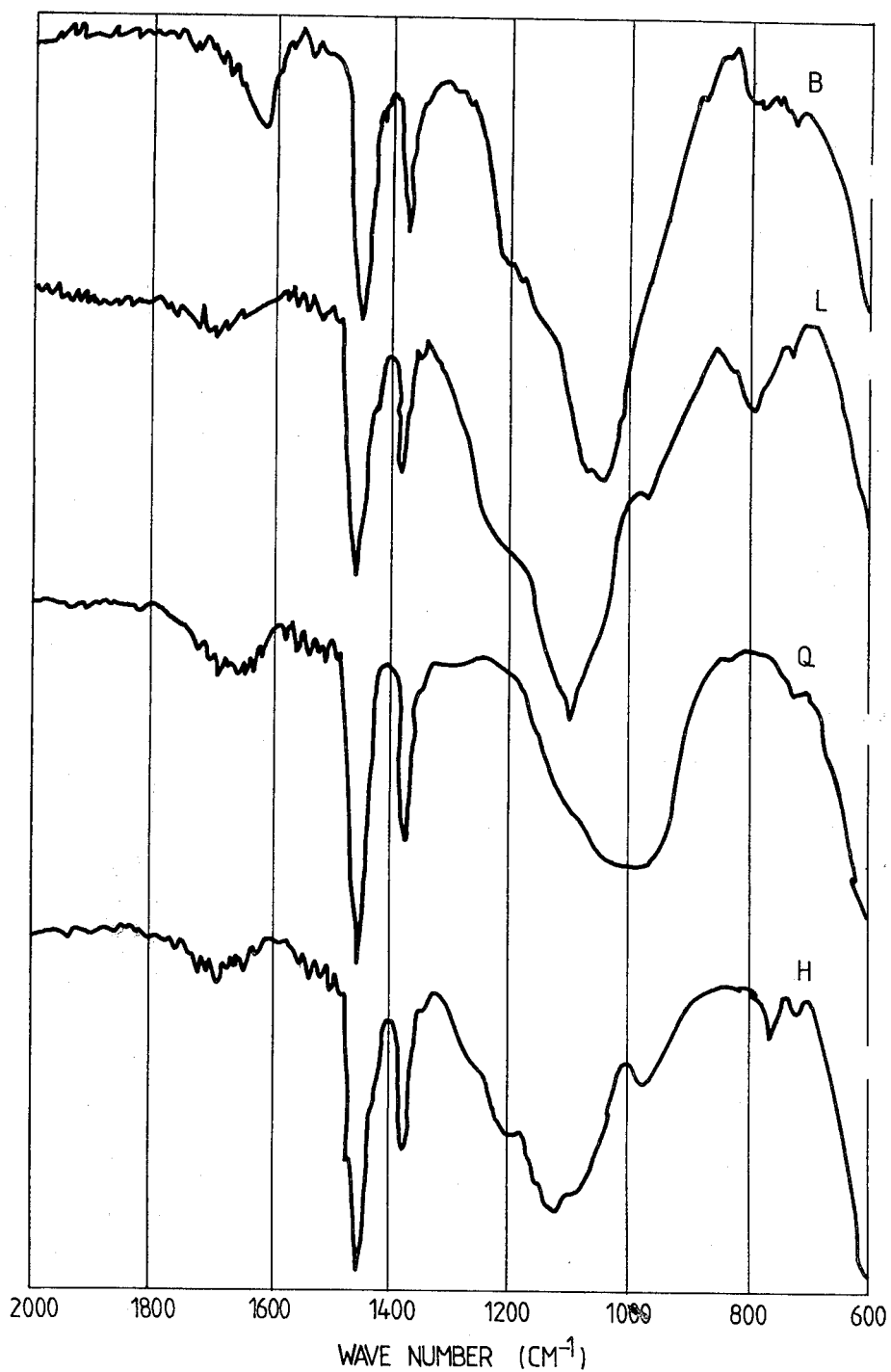

FIG. 3—shows the infra-red spectrograph of the materials (Q), (H), (B) and (L). The abscissa is divided into wave numbers expressed in cm$^{-1}$.

Figure 4:
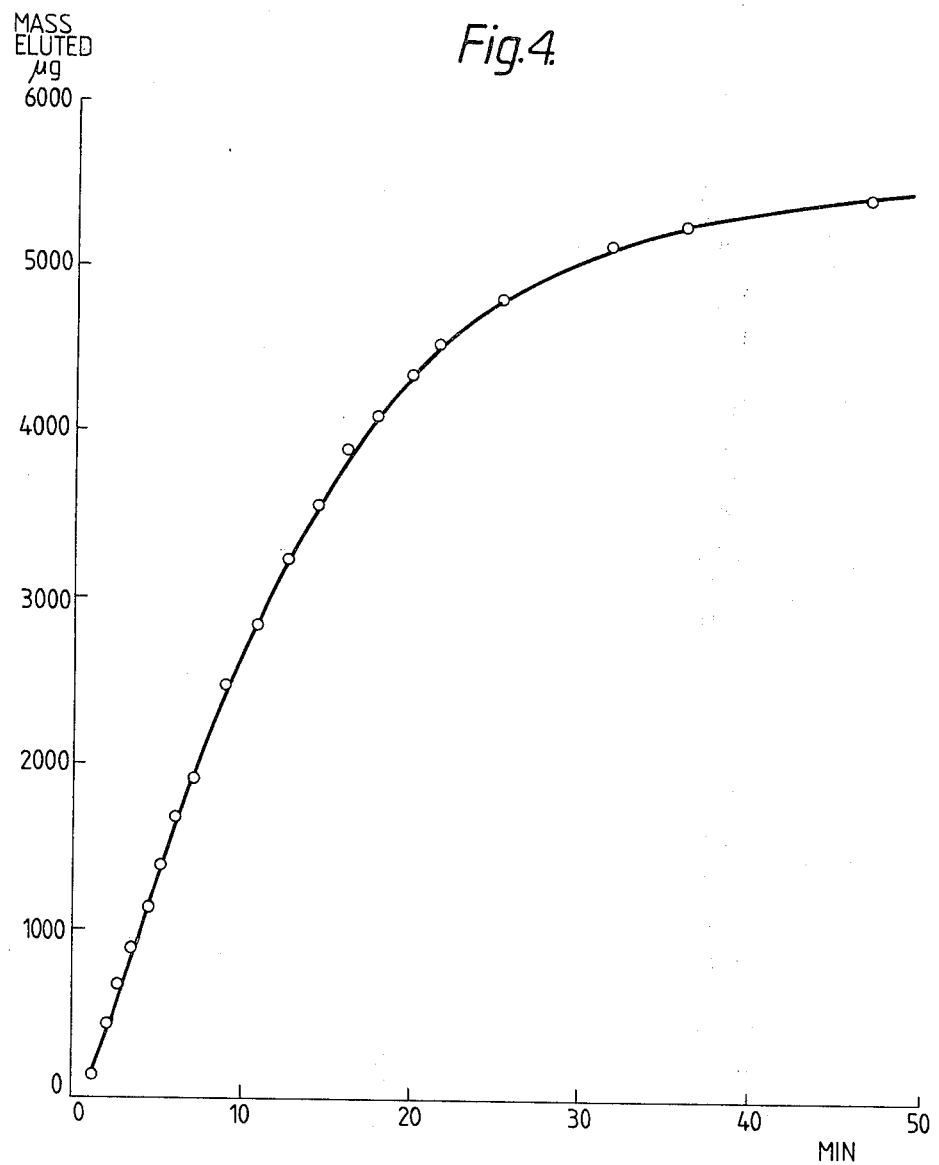

FIG. 4—shows a plot of the mass of chloride eluted (in micrograms) on the ordinate against time (in minutes) on the abscissa from the aluminophosphorus compound prepared according to Example 2 from pelleted zeolite 4A.

EXAMPLE 1

Preparative

Zeolite 4A powder (sodium form) (Q) as supplied by Laporte Industries Limited of Widnes, England was used as the starting material; A layer of Q was placed on top of nine times its weight of ammonium dihydrogen orthophosphate, and the materials were heated slowly to 230° C. From the time when the ammonium dihydrogen orthophosphate began to melt the mixture was occasionally stirred. A temperature of 230° C. was maintained for eight hours. Then the mixture was poured, while still hot, into 20 times its weight of boiling water. After vigorous stirring, the product was centrifuged and the solid thus separated was washed five times with water and dried at 110° C. The product thus obtained will be referred to as H.

Characterisation and properties of H (a) H was analysed by x-ray fluorescence to determine the Si:Al:P ratio, and for comparison the starting material Q was analysed in the same manner. The results were as follows:

|   | Si:Al:P |
|---|---|
| Q | 1.02:1:0 |
| H | 1.78:1:2.14 |

(b) H was found, by wet analysis, to contain 7.62 percent by weight of Si. Wet analysis for Al and P is unfortunately difficult in their mutual presence.

(c) The x-ray powder diffraction patterns of Q and H are compared in Table I. No bulk NH$_4$H$_2$PO$_4$ phase (which has strong reflections at 5.32 Å and 3.75 Å) was detected. There are reflections present having spacings above 5.78 Å. These reflections may possibly be attributed to residual quantities of Zeolite 4A or a modified form thereof.

TABLE I

| Q | | H | |
|---|---|---|---|
| d/Å | I/Io | d/Å | I/Io |
| 12.08 | 100 | 12.08 | 72 |
| 8.54 | 60 | 8.57 | 39 |
| 7.00 | 40 | 6.32 | 13 |
| 5.46 | 16 | 5.78 | 72 |

TABLE I-continued

| Q | | H | |
|---|---|---|---|
| d/Å | I/Io | d/Å | I/Io |
| 4.08 | 59 | 5.27 | 30 |
| 3.71 | 70 | 4.89 | 20 |
| 3.40 | 20 | 4.13 | 44 |
| 3.28 | 23 | 3.95 | 81 |
| 2.98 | 55 | 3.38 | 22 |
| 2.75 | 20 | 3.12 | 35 |
| 2.62 | 30 | 2.95 | 100 |
| 2.51 | 12 | 2.61 | 15 |
| 2.46 | 11 | 2.49 | 9 |
| 2.37 | 10 | 2.42 | 26 |
| 2.25 | 9 | 2.32 | 22 |
| 2.18 | 11 | 2.19 | 5 |
| 2.05 | 17 | 2.15 | 7 |
| 1.92 | 9 | 2.07 | 9 |
| 1.89 | 9 | 2.02 | 11 |
| 1.83 | 8 | 1.95 | 22 |
| 1.74 | 15 | 1.91 | 7 |
| 1.69 | 10 | 1.85 | 9 |
| 1.60 | 9 | 1.74 | 20 |
| 1.57 | 8 | 1.68 | 10 |
| 1.43 | 5 | 1.60 | 16 |
| 1.40 | 8 | 1.53 | 25 |
| 1.34 | 11 | 1.48 | 19 |
| 1.32 | 7 | 1.35 | 13 |
| 1.29 | 6 | 1.30 | 9 |
| 1.25 | 8 | 1.24 | 14 |
| 1.22 | 5 | 1.22 | 8 |

(d) DTA traces for Q and H are given in FIG. 1, and DSC traces in FIG. 2.

(f) Infra-red spectra of Q and H are given in FIG. 3. It will be seen that Q displays a marked peak at about 1130 cm$^{-1}$.

(g) Water-leaching of H removed 4.7% of the P present. This was demonstrated both by determining phosphate in the water used for leaching and by checking the maximum weight loss on repeated water washing.

(h) H was placed in a tube with an aqueous solution of NaCl of 0.5 mol/liter concentration and the tube was rotated horizontally overnight at 80° C. The uptake of sodium from the solution was 2.8% of the exchangeable sodium content of an equal mass of Q. In a similar experiment with KCl, the number of moles of potassium taken up from the solution was 3.2% of the number of moles of exchangeable sodium in an equal mass of Q.

(i) H had an anion-exchange properties but because of its particle size it was preferred to perform detailed experiments on material made from zeolite 4A pellets (see Example 2).

EXAMPLE 2

Preparative

The starting material was sodium zeolite 4A pellets as supplied by Laporte Industries of Widnes, England. These pellets contain about 20 weight percent of a binder in addition to the zeolite itself. The procedure of Example 1 was modified in that a boiling aqueous solution of NH$_4$Cl of concentration 1 mol/liter was used instead of boiling water, and in that an after-treatment was performed. This after-treatment involved placing the product in a tube with aqueous NH$_4$Cl solution of concentration 1 mol/liter at 80° C. and rotating the tube horizontally overnight. Thereafter, the product was filtered and the residue thus obtained was washed with water and dried at 110° C. This product is referred to as J.

Characterisation and properties of J

J (2 g) was washed with water until the washings contained no chloride, and then was placed in a column. The column had an outer diameter of 0.5 cm and the packed length of the column was 10 cm. Then an aqueous solution of NaF of concentration 0.1 mol/liter was passed into the column. The rate of flow was 1 cm$^3$ per 4 min. The total amount of Cl$^-$ eluted is plotted as a function of time (the time zero is arbitrary) in FIG. 6.

The experiment shows the presence of exchangeable chloride anions in J.

EXAMPLE 3

Preparation of purified sodium clinoptilolite ("B") from Hector clinoptilolite ("A")

The Hector clinoptilolite was supplied by the Baroid Division of National Lead (USA) and which according to the suppliers was of 85-95% purity. The analysis of this material (which is referred to as A) is given in Table II and the x-ray powder diffraction pattern is given in Table III. Lines marked in Table III are thought to be due to impurity phases.

A was powdered, refluxed with water to remove soluble impurities; refluxed with aqueous ammonium chloride solution (saturated at room temperature) to remove carbonates; washed with water until chloride-free; treated with an aqueous 1.0 mol/liter solution of NaCl to reduce the concentration of exchangeable cations other than sodium; washed with water until chloride-free; and dried at 100° C. in air. The analysis and x-ray powder diffraction pattern of the product, B, are given in Tables II and III.

TABLE II

|  | A | B |
|---|---|---|
| $SiO_2$ | 61.10 | 67.22 |
| $Al_2O_3$ | 10.52 | 11.08 |
| $Fe_2O_3$ | 0.91 | 0.78 |
| $TiO_2$ | 0.36 | 0.32 |
| CaO | 3.34 | 0.27 |
| MgO | 0.47 | 0.11 |
| $Na_2O$ | 5.30 | 5.38 |
| $K_2O$ | 1.48 | 0.60 |
| loss at 110° C. | 8.36 | 6.17 |
| Additional loss at 900° C. | 8.72 | 7.44 |
| TOTAL | 100.56 | 99.37 |

Preparation of an anion exchanger ("L") from B

This preparation followed that in Example 1 except that the zeolite starting material was B instead of Q. The product is referred to as "L".

Characterisation of L (a) L was analysed by x-ray fluorescence, and for comparison B was analysed in the same manner. The results were:

| | Si:Al:P |
|---|---|
| B | 5.13:1:0 |
| L | 4.70:1:2.40 |

(b) L was found, by wet analysis, to contain 25.5 weight % Si.

(c) The x-ray powder diffraction pattern of L is given in Table III. No bulk $NH_4H_2PO_4$ phase is evident. The reflections above 5.91 angstroms may be due to the presence of residual quantities of clinoptilolite or a modified form thereof.

(d) The DTA traces for B and L are given in FIG. 1, and DSC traces in FIG. 2.

(e) Infra-red spectra of B and L are given in FIG. 3. It will be seen that B displays a marked peak at about 1100 cm$^{-1}$.

(f) Water leaching of L removed 4.3% of the P present (the technique was as described under (g) in Example 1).

(g) The experiment described for H on sodium and potassium exchange compared with Q (see Example 1 characterisation section paragraph (h)) was repeated for L compared with B. The percentages were 15% for sodium and 12.4% for potassium.

(h) The product had anion-exchange properties.

TABLE III

| A | | B | | L | |
|---|---|---|---|---|---|
| d/Å, | Int. | d/Å, | I/Io | d/Å, | I/o. |
| 11.4 | w* | 8.70 | 80 | 8.91 | 56 |
| 8.8 | s | 7.80 | 55 | 7.68 | 56 |
| 7.8 | s | 6.81 | 57 | 7.45 | 44 |
| 6.8 | ms | 5.12 | 30 | 5.91 | 62 |
| 6.6 | mw* | 3.95 | 100 | 5.42 | 40 |
| 5.2 | mw* | 3.31 | 80 | 4.94 | 31 |
| 5.1 | ms | 3.14 | 44 | 4.17 | 56 |
| 4.62 | m | 3.09 | 47 | 3.96 | 80 |
| 4.5 | mw* | 2.94 | 56 | 3.81 | 47 |
| 4.35 | mw | 2.76 | 38 | 3.39 | 61 |
| 4.22 | mw* | 2.52 | 12 | 3.12 | 40 |
| 3.95 | vs | 2.42 | 19 | 2.97 | 100 |
| 3.85 | m | 1.94 | 15 | 2.43 | 21 |
| 3.31 | s* | 1.80 | 17 | 2.33 | 17 |
| 3.13 | m | 1.48 | 17 | 2.03 | 16 |
| 3.0 | m | | | 1.97 | 16 |
| 2.94 | s | | | 1.75 | 17 |
| 2.77 | s | | | 1.69 | 11 |
| 2.70 | m | | | 1.61 | 11 |
| | | | | 1.51 | 17 |
| | | | | 1.48 | 13 |
| | | | | 1.38 | 11 | vs = very strong
s = strong
ms = medium-strong
m = medium
mw = medium weak
w = weak
vw = very weak

EXAMPLES 4-10

A series of preparations of aluminophosphorus compounds was undertaken using the following aluminous compounds as starting materials.

| EXAMPLE | | |
|---|---|---|
| 4 | Zeolite A powder | ($SiO_2:Al_2O_3$ = 2:1) Laporte Industries. |
| 5 | Zeolite A pellets | (as Example 4 but with 20% wt binder) Laporte Industries. |
| 6 | Zeolite X powder | ($SiO_2:Al_2O_3$ = 2.45:1) Laporte Industries. |
| 7 | Zeolite Y powder | ($SiO_2:Al_2O_3$ = 5.08:1) Laporte Industries |
| 8 | Kaolinite | ("Buca" grade) Freeport Kaolin Company. |
| 9 | Metakaolinite | (The Kaolinite of Example 8 calcined at 550° C. for 1 hour). |
| 10 | Alumina | (40-80 mesh). Laporte Industries. |

The following procedure was adopted. Ammonium dihydrogen orthophosphate was introduced into a 3-necked reaction flask which was fitted with a stirrer and an oilfilled glass tube containing a thermocouple one neck being left open. The flask was heated to melt the orthophosphate which was stirred vigorously. One tenth, by weight of the orthophosphate, of the appropriate aluminous compound was introduced into the molten orthophosphate through the open flask neck and a temperature of 230° C. was maintained in the flask content for 24 hours. In all cases ammonia was evolved. The hot mixture was then poured into 20 times its weight of boiling water which was then stirred and subjected to filtration to remove solids. The solids were washed several times with water and dried at 110° C. On x-ray powder diffraction examination the products of Examples 6 to 10 showed the patterns set out in Table IV below. Only the reflections above 1.5 angstroms are listed. The products of Examples 4 and 5 also showed patterns containing a substantial number of identifying features common with those of the other Examples leading to the conclusion that they also contained a novel aluminophosphorus compound according to the invention.

TABLE IV

| Example 6 | | Example 7 | | Example 8 | | Example 9 | | Example 10 | |
|---|---|---|---|---|---|---|---|---|---|
| d/Å | Int | d/Å | Int | d/Å | Int | d/Å | Int | d/Å | Int |
| 5.72 | m | 5.70 | w | 5.75 | s | 3.89 | m | 5.78 | vs |
| 5.25 | vw | 5.20 | vw | 5.28 | vw | 3.35 | vw | 5.25 | m |
| 4.80 | vw | 4.10 | vw | 4.85 | w | 3.11 | vw | 4.83 | w |
| 4.18 | vw | 3.86 | w | 4.20 | w | 2.92 | m | 4.21 | m |
| 4.10 | w | 3.34 | vw | 4.12 | m | 2.59 | vw | 4.12 | s |
| 3.89 | m | 2.91 | w | 3.90 | s | 2.41 | vw | 3.89 | vs |
| 3.35 | vw | 2.40 | vw | 3.37 | w | 2.30 | vw | 3.62 | vw |
| 3.10 | vw | 1.93 | vw | 3.11 | vw | 2.13 | vw | 3.35 | m |
| 3.04 | vw | 1.52 | vw | 3.05 | vw | 2.02 | vw | 3.11 | m |
| 2.93 | m | | | 2.94 | s | 1.95 | vw | 3.04 | w |
| 2.64 | vw | | | 2.61 | vw | 1.83 | vw | 2.93 | vs |
| 2.59 | vw | | | 2.42 | vw | 1.72 | vw | 2.66 | vw |
| 2.41 | vw | | | 2.32 | w | 1.59 | vw | 2.59 | w |
| 2.31 | vw | | | 2.29 | vw | 1.52 | vw | 2.52 | vw |
| 2.14 | vw | | | 2.19 | vw | | | 2.48 | vw |
| 1.95 | vw | | | 2.15 | w | | | 2.41 | m |
| 1.92 | vw | | | 2.07 | vw | | | 2.38 | w |
| 1.83 | vw | | | 2.03 | vw | | | 2.32 | m |
| 1.73 | vw | | | 1.97 | vw | | | 2.28 | m |
| 1.64 | vw | | | 1.95 | w | | | 2.22 | vw |
| 1.60 | vw | | | 1.90 | vw | | | 2.18 | vw |
| 1.52 | vw | | | 1.85 | vw | | | 2.13 | w |
| | | | | 1.74 | vw | | | 2.11 | vw |
| | | | | 1.63 | vw | | | 2.06 | w |
| | | | | 1.60 | vw | | | 2.03 | vw |
| | | | | 1.53 | w | | | 2.00 | vw |
| | | | | | | | | 1.97 | vw |
| | | | | | | | | 1.95 | m |
| | | | | | | | | 1.92 | vw |
| | | | | | | | | 1.89 | vw |
| | | | | | | | | 1.87 | vw |
| | | | | | | | | 1.83 | m |
| | | | | | | | | 1.73 | m |
| | | | | | | | | 1.70 | vw |
| | | | | | | | | 1.67 | w |
| | | | | | | | | 1.64 | vw |
| | | | | | | | | 1.61 | w |
| | | | | | | | | 1.59 | w |
| | | | | | | | | 1.56 | vw |
| | | | | | | | | 1.55 | vw |
| | | | | | | | | 1.54 | vw |
| | | | | | | | | 1.52 | m |

On analysis by x-ray fluorescence the products showed the following Si:Al:P atomic ratios.
Example 4—0.52:1.0:2.08
Example 6—0.50:1.0:2.08
Example 7—2.51:1.0:2.24
Example 10—0:1.0:2.02

Analysis of the product of Example 10 showed the presence of nitrogen. Infra-red spectrophotometry did not reveal the presence of structural or co-ordinated water. Thermogravimetric analysis showed a weight loss at 500° C.–600° C.

The product of Example 5 was examined with reference to its ability to exchange anions. A 4 g sample of the product was placed in a 0.5 cm diameter 20 cm high column and was eluted with 3 liters of 0.1 mol/liter NaF. Testing with Ag $NO_3$ showed the elution of metaphosphate ion ($PO^{-3}$). The column was then washed with distilled water many times. Then the column was eluted with a 0.1 mole/liter NaOH solution and, using a fluoride specific ion electrode (Orion Co), elution of fluoride was observed. Then the column was washed, once more, many times with distilled water and was eluted with a 0.2 mole/liter NaF solution whereupon the elution of hydroxide was found to take place demonstrating anability for reversible anion exchange.

The product of Example 4 and Example 10 were examined to determine their anion exchange capacity with respect to fluoride and capacities of 3.26 meg/g and 0.8 meg/g were noted.

We claim:

1. A process for the preparation of an anion exchanger comprising an aluminophosphorus compound comprising contacting an aluminous compound with an excess, over that required to form the aluminophosphorus compound, of an ammonium phosphate melt, thereafter dissolving the excess of phosphate used to form the melt in water or an aqueous solution and recovering the remaining crystalline water insoluble aluminophosphorus compound.

2. A process as claimed in claim 1 wherein the aluminous compound is contacted with the melt for at least 5 hours.

3. A process as claimed in claim 2 wherein the aluminous compound is contacted with the melt for at least 7 hours.

4. A process as claimed in claim 1 wherein the aluminous compound is a zeolite a clay or an alumina or a calcined derivative of any of the foregoing.

5. A process as claimed in claim 1 wherein the aluminous compound is a zeolite having a $SiO_2$ to $Al_2O_3$ ratio of from 1 to 10.

6. A process as claimed in claim 1 wherein the aluminous compound is a kaolin group clay or a calcined derivative thereof.

7. A process as claimed in claim 1 wherein the aluminous compound is alumina.

8. A process as claimed in claim 1 wherein the phosphate is ammonium dihydrogen orthophosphate.

9. A process as claimed in claim 1 wherein the phosphate is in an at least 3 fold weight excess over the aluminous compound.

10. A process as claimed in claim 1 wherein the melt has a temperature not more than 100° C. above the melting temperature of the phosphate.

11. A water insoluble crystalline anion exchanger comprising an aluminophosphorus compound consisting essentially of a cationic framework of aluminum, oxygen and phosphorus atoms, the ratio of the number of atoms of phosphorus to the number of atoms of aluminum being greater than 1:1, and, optionally, silicon atoms.

12. A compound as claimed in claim 11 wherein the said ratio is from 1.5 to 3.

13. A compound as claimed in claim 12 wherein the said ratio is from 2 to 2.5.

14. A compound as claimed in claim 11 also containing silica.

15. A compound as claimed in claim 11 not containing structural or coordinated water as shown by infrared absorbtion analysis.

16. A compound as claimed in claim 11 having an x-ray diffraction pattern showing lines at the following d-spacings:

| d-spacings (A) | Intensity |
| --- | --- |
| 5.78 | VS |
| 5.25 | W |
| 4.84 | W |
| 4.15 | M |
| 3.90 | S |
| 3.37 | W |
| 3.12 | W |
| 2.94 | VS |
| 2.60 | VW |
| 2.47 | VW |
| 2.42 | W |
| 2.31 | W |
| 2.06 | W |
| 1.94 | M |

VS = very strong
S = strong
M = medium
W = weak
VW = very weak

* * * * *